United States Patent [19]
Canada et al.

[11] 3,873,550
[45] Mar. 25, 1975

[54] ANTIMICROBIAL BIS(DIHALONITRO-METHYL)PYRIDINES

[75] Inventors: Emily J. Canada; Henry Friedman, both of Indianapolis, Ind.

[73] Assignee: Eli Lilly and Company, Indianapolis, Ind.

[22] Filed: Oct. 25, 1973

[21] Appl. No.: 409,557

[52] U.S. Cl. ........ 260/290 HL, 260/290 R, 424/263
[51] Int. Cl............................................. C07d 31/40
[58] Field of Search............................ 260/290, 778

[56] References Cited
UNITED STATES PATENTS
3,387,044    6/1968    Grakauskas......................... 260/290

Primary Examiner—Harry I. Moatz
Attorney, Agent, or Firm—Joseph A. Jones; Everet F. Smith

[57] ABSTRACT

Novel bis(dihalonitromethyl)pyridines, useful as broad spectrum antimicrobials, are prepared from the corresponding nitronate salts, which have not previously been obtainable.

5 Claims, No Drawings

ANTIMICROBIAL BIS(DIHALONITRO-METHYL)PYRIDINES

BACKGROUND OF THE INVENTION

This invention concerns novel bis(dihalonitromethyl)-pyridines which are useful microbiocides.

The nitration of active methylene compounds containing an activating group such as an ester, ketone or cyano group has been previously described. See Feuer et al., *J. Am. Chem. Soc.*, 78, 4364 (1956), Ibid., 81, 5826 (1959), *J. Org. Chem.*, 29, 939 (1964), Ibid., 31, 3152 (1966), Ibid., 34, 991 (1969); and Klager, *J. Org. Chem.*, 20, 646 (1955).

In addition, p-anisylnitromethane and its ring nitro derivatives have been prepared by Zalukajevs et al., *Latvijas P.S.R. Zinatnu Akad. Vestis*, 109, (1956). The same author also prepared α-naphthylnitromethane, *J, Gen. Chem. U.S.S.R.*, 26, 657 (1956).

Primary and secondary nitro compounds form nitronate salts which react with bromine to form bromonitro compounds. In the case of α-nitrocyclic ketones, cleavage can occur upon bromination. See Feuer et al., *J. Org. Chem.*, 29, 939 (1964), Ibid., 33, 3622 (1968), Ibid., 34, 991 (1969). The preparation of halo derivatives of various nitromethyl heterocycles was recently disclosed by Feuer et al., *J. Org. Chem.*, 37, 3662 (1972). Zalukajevs et al. prepared the halo derivatives of 2-nitromethylquinoline, *Zhur. Obshchei Khim.*, 28, 483 (1958).

There is no suggestion in any of the above-described publications that any of the compounds possess antimicrobial activity.

Belgian Patent No. 702,570 discloses 1-aryl-2-nitrohaloethanes useful in the control of bacteria, fungi and algae in water and aqueous compositions. Gum et al., U.S. Pat. Nos. 3,703,515 and 3,754,042, disclose dihalonitromethyl-substituted quinoxalines and cycloalkanes, respectively, which are said to have antimicrobial activity.

SUMMARY

We have now discovered a class of novel bis(dihalonitromethyl)pyridines which possess excellent antimicrobial activity. Such compounds are those having the formula

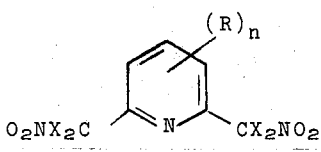

wherein

X represents chloro or bromo;

each of the R groups independently represents $C_1-C_3$ alkyl;

n represents 0-2.

DESCRIPTION OF THE PREFERRED EMBODIMENT

The compounds of this invention are characterized by dihalonitromethyl groups attached at the 2- and 6-positions of the pyridine ring, which may be additionally substituted. The R substituents have no effect on the synthesis of the compounds, and may occupy the 3, 4, or 5-positions.

The general chemical terms used to describe the new compounds are used in their normal meanings. $C_1-C_3$ alkyl is used to refer to groups such as methyl, ethyl, n-propyl and isopropyl.

The compounds named below are typical of the invention, and are mentioned to assure that those skilled in the art understand the scope of the invention. It is not intended, of course, that the named compounds limit the scope of the invention.

2,6-bis(dichloronitromethyl)-4-picoline
2,6-bis(dibromonitromethyl)-3,5-diethylpyridine
2,6-bis(dibromonitromethyl)-3-propylpyridine
2,6-bis(dichloronitromethyl)-4-ethylpyridine
2,6-bis(dibromonitromethyl)-3-picoline
2,6-bis(dichloronitromethyl)-3-isopropyl-4-ethylpyridine
2,6-bis(dichloronitromethyl)-4-propyl-3-picoline
2,6-bis(dichloronitromethyl)-3,4-lutidine The compounds of our invention are prepared in a two-step synthesis from 2,6-lutidines having the desired substitution pattern. Such compounds are commercially available or can be prepared using known procedures in the chemical literature.

The first step of the synthesis is the formation of a disubstituted nitronate salt having the structure

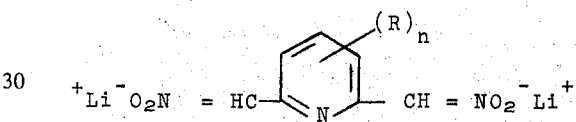

Such nitronate salts were heretofore unobtainable. The prior art method of forming nitronate salts is well described by Feuer et al., *J. Am. Chem. Soc.*, 91, 1856 (1969). The process is carried out by treating an activated methylene group with an alkali metal amide in liquid ammonia, followed by n-propyl nitrate as the nitrating reagent, at low temperature. Alternatively, in the absence of an activated methyl group, a nitronate salt can be formed by the treatment of a nitromethyl-substituted compound with sodium ethoxide in ethanol. Such treatment of a dimethyl compound, such as 2,6-lutidine, forms the nitronate salt on only one of the methyl groups.

Unexpectedly, we have found that the desired disubstituted nitronate salts can be formed by reaction of a 2,6-lutidine with n-butyllithium in anhydrous tetrahydrofuran at temperatures near −50°C., followed by the low temperature addition of a nitrating agent such as n-propyl nitrate.

The nitronate salt is converted to the bis(dihalonitromethyl) compounds of the present invention by treatment with a halogenating reagent. The α,α-dichloro compounds are prepared from the nitronate salts by treating with potassium hypochlorite at temperatures between −10° and 20°C. The corresponding dibromo compounds are best prepared by treatment with bromine in potassium hydroxide solution under similar conditions. The use of a two-fold excess of the aqueous halogenating reagent quickly forms the bis(dihalonitromethyl) compound, generally is less than one hour.

The examples below illustrate the methods by which the compounds are made, and are not intended to limit the scope of the invention in any way. The first example shows the synthesis of the nitronate salt.

EXAMPLE 1 lithium 2,6-lutidinedinitronate

A 5.3 g. portion of 2,6-lutidine was dissolved in 250 ml. of anhydrous tetrahydrofuran and cooled to about −50°C. Then 0.10 mole of n-butyllithium was added at a rate such that the temperature of the reaction medium did not rise above −50°C. After the addition, the mixture was stirred for about 2 hours at −55°C., and 20.9 g. of n-propyl nitrate was added, keeping the temperature below −50°C. during the addition. The mixture was then allowed to warm slowly to room temperature, and the solvent was removed under vacuum. Dry ethyl ether was added to the residue, and the solids were collected by filtration, washed with ethyl ether, and vacuum dried. The yield was 11.7 g. of a mixture of lithium 2-picolinenitronate and lithium 2,6-lutidinedinitronate, which was used in the following step without further purification.

The following examples show the synthesis of typical bis(dihalonitromethyl)pyridines.

EXAMPLE 2

2,6-bis(dichloronitromethyl)pyridine

An 11.4 g. portion of the salt prepared above was dissolved in 100 ml. of water, and the solutions was filtered. The solution was added dropwise to 250 ml. of 2.2 molar potassium hypochlorite at 5°–10°C. After stirring for about one-half hour, the mixture was extracted with ethyl ether, and the extract was dried and evaporated under vacuum, leaving a dark oil.

The oil was chromatographed over a silica gel column with benzene as the eluent. The first fractions collected were pooled, and evaporated under vacuum to yield 1.2 g. of 2,6-bis(dichloronitromethyl)pyridine (I), m.p. 88°–90°C., the identity of which was confirmed by elemental analysis.

EXAMPLE 3

2,6-bis(dibromonitromethyl)-4-picoline

To a solution of 17 g. of KOH in 65 ml. of water, cooled to 0° to 5°C., was added 17 g. of bromine at such a rate that the temperature did not rise above 5°C. An aqueous solution of 6.2 g. of lithium 4-methyl-2,6-lutidinedinitronate, which had been filtered to remove insoluble material, was added. After stirring for one hour at ambient temperature, the solution was extracted with ethyl ether. The ether extract was dried over magnesium sulfate and evaporated under vacuum leaving an oily residue. The residue was taken up in benzene and chromatographed over silica gel. The product-containing fractions were poured into hexane to recrystallize 2,6-bis(dibromonitromethyl)-4-picoline (IV), m.p. 111°–114°C, the identity of which was confirmed by elemental analysis.

The processes above were used, with only small modifications easily supplied by one skilled in the art, to make the other compounds of the present invention, such as those below.

2,6-bis(dibromonitromethyl)pyridine (II), m.p. 134°–137°C.

2,6-bis(dichloronitromethyl)-4-picoline (III), m.p. 87°–89°C.

The compounds of the present invention are biocides in a broad sense. As the examples below indicate, the compounds kill or control microorganisms such as bacteria, fungi, protozoa, and algae. Those skilled in the art will appreciate that the biocidal properties of the compounds make them useful in many ways.

For example, the compounds can be added to bodies of water such as cooling towers and ponds, lagoons, lakes and the like for the control of algae and slime-forming microorganisms. The control is brought about by adding an effective, economical amount such as from about 0.1 to about 100 ppm. of the compound to the water to be protected from aquatic organisms. It is often convenient to formulate the compound in an easily waterdispersible mixture before addition. Such formulations are known to the art, and comprise a finely divided powder, or a solution or suspension of the compound in a liquid such as water or an organic solvent, to which surfactants such as ethylene oxide adducts of nonylphenol and alkylbenzenesulfonates are often added to increase the dispersibility of the mixture.

The compounds may be added to such compositions as adhesives, inks, plasticizers, latices, polymers, resins, fuels, lubricants, soaps and detergents, cutting oils, and paints to prevent the growth of mold and the degradation of the products which results from attack by microorganisms. The compounds may also be used as coatings or impregnants for products such as textiles, paper and other cellulose products, wood, and wall panelings and plaster to protect such substances from mold and decay caused by microbial infestation. The method is especially useful for the preservation of such products as cosmetic formulations.

The compounds are also useful as disinfectants and sterilizing agents for surfaces such as floors, walls, hospital equipment, kitchen equipment and the like.

The example below reports the results of testing a representative group of the compounds in a broad-spectrum antimicrobial screen.

EXAMPLE 4 in vitro agar dilution test

Bacteria and fungi in an agar medium were stamped on a plate to which one drop of 100 μg./ml. or a 10 μg./ml. solution of the compound was surface applied. The agar plates were then incubated at 35°C. for 12 hours, at which time the antibacterial activities were evaluated. The fungi were incubated at 25°C. for an additional 60 hours before evaluation. The procedure was essentially that recommended in *Acta Pathol. Microbiol. Scad. B.*, Suppl. 217, 11 (1971). A rating of 100 indicates that the compound prevented growth of the microbe at 100 μg./ml. and 10 indicates prevention at the 10 μg./ml. level. NT indicates the compound was not tested for activity against an organism, while a black space indicates the compound was not active at the highest level tested (100 μg./ml.).

| Compound | I | II |
|---|---|---|
| Staphylococcus aureus 3055 | 10 | 100 |
| Staphylococcus aureus 3074 | 10 | 100 |
| Streptococcus faecalis X66 | 10 | |
| Proteus morganii PR15 | 10 | 100 |
| Salmonella typhosa SA12 | 10 | |
| Klebsiella pneumoniae KL14 | | |

| Compound | I | II |
|---|---|---|
| Enterobacter aerogenes EB17 | | |
| Serratia marcescens SE3 | | |
| Escherichia coli EC14 | 10 | |
| Citrobacter freundii CF17 | | |
| Pseudomonas aeruginosa X239 | | |
| Bordetella bronchiseptica 16 | 10 | 100 |
| Salmonella typhimurium | 10 | |
| Pseudomonas solanacearum X185 | | |
| Erwinia amylovora | 10 | 100 |
| Candida tropicalis A17 | 10 | |
| Trichophyton mentagrophytes | 10 | |
| Aspergillus flavis E | 10 | |
| Ceratocystis ulmi | 10 | |

The example below reports a representative result of testing the compounds in a slightly different in vitro test against a different group of microorganisms.

EXAMPLE 5 in vitro tube dilution test

The organisms against which the compounds were to be tested were grown in nutrient broth in test tubes under sterile conditions. One hundred μg./ml. of the compound to be tested was added to a tube of broth, and the treated broth was serially diluted with untreated broth in which the culture had been inoculated. The tubes were observed, and the results for each compound were recorded as the lowest concentration, in micrograms per milliliter in which the compound prevented the growth of the microorganism.

| Compound | I |
|---|---|
| Staphylococcus sp. 1130 | <0.78 |
| Streptococcus sp. 80 | 1.56 |
| Pasteurella multocida (bovine) | <0.78 |
| Pasteurella multocida (avian) | <0.78 |
| Pasteurella hemolytica | |
| Vibrio coli | 1.56 |
| Bordetella bronchiseptica | 1.56 |
| Escherichia coli | 6.25 |
| Salmonella dublin | 3.12 |
| Pseudomonas sp. | >50 |
| Mycoplasma gallisepticum | 3.12 |
| Mycoplasma synoviae | 3.12 |
| Mycoplasma hyorhinis | 12.5 |
| Mycoplasma hyosynoviae | |
| Mycoplasma hyopneumoniae | 6.25 |
| Erysipelothrix rhusiopathiae | |

We claim:
1. A compound of the formula

$$O_2NX_2C \underset{N}{\overset{(R)_n}{\diagup\!\!\!\diagdown}} CX_2NO_2$$

wherein
X represents chloro or bromo;
each of the R groups independently represents $C_1$–$C_3$ alkyl;
$n$ represents 0–2.
2. The compound of claim 1 which is 2,6-bis(dichloronitromethyl)pyridine.
3. The compound of claim 1 which is 2,6-bis(dibromonitromethyl)pyridine.
4. The compound of claim 1 which is 2,6-bis(dichloronitromethyl)-4-picoline.
5. The compound of claim 1 which is 2,6-bis(dibromonitromethyl)-4-picoline.

* * * * *